Patented Aug. 28, 1951

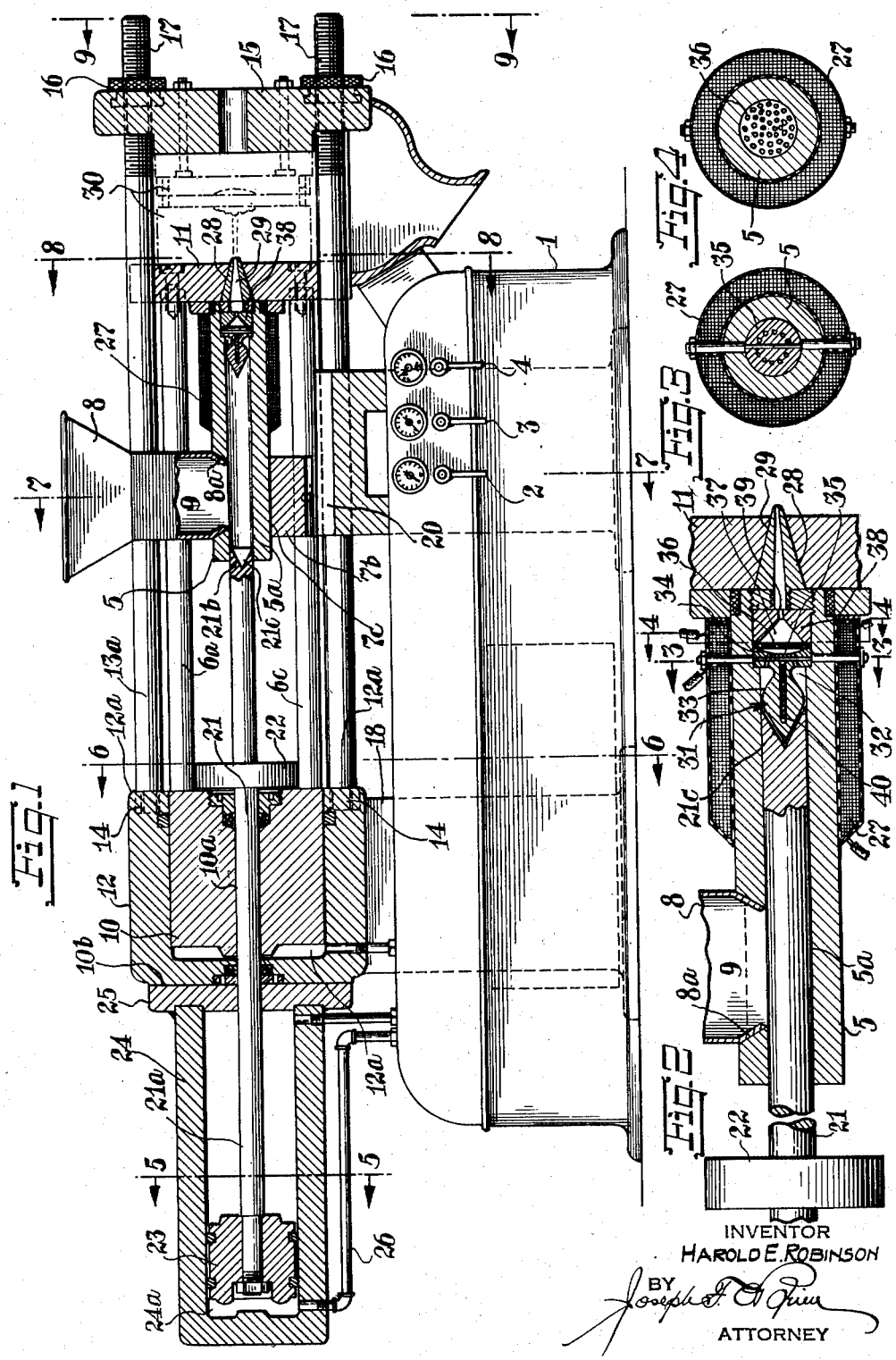

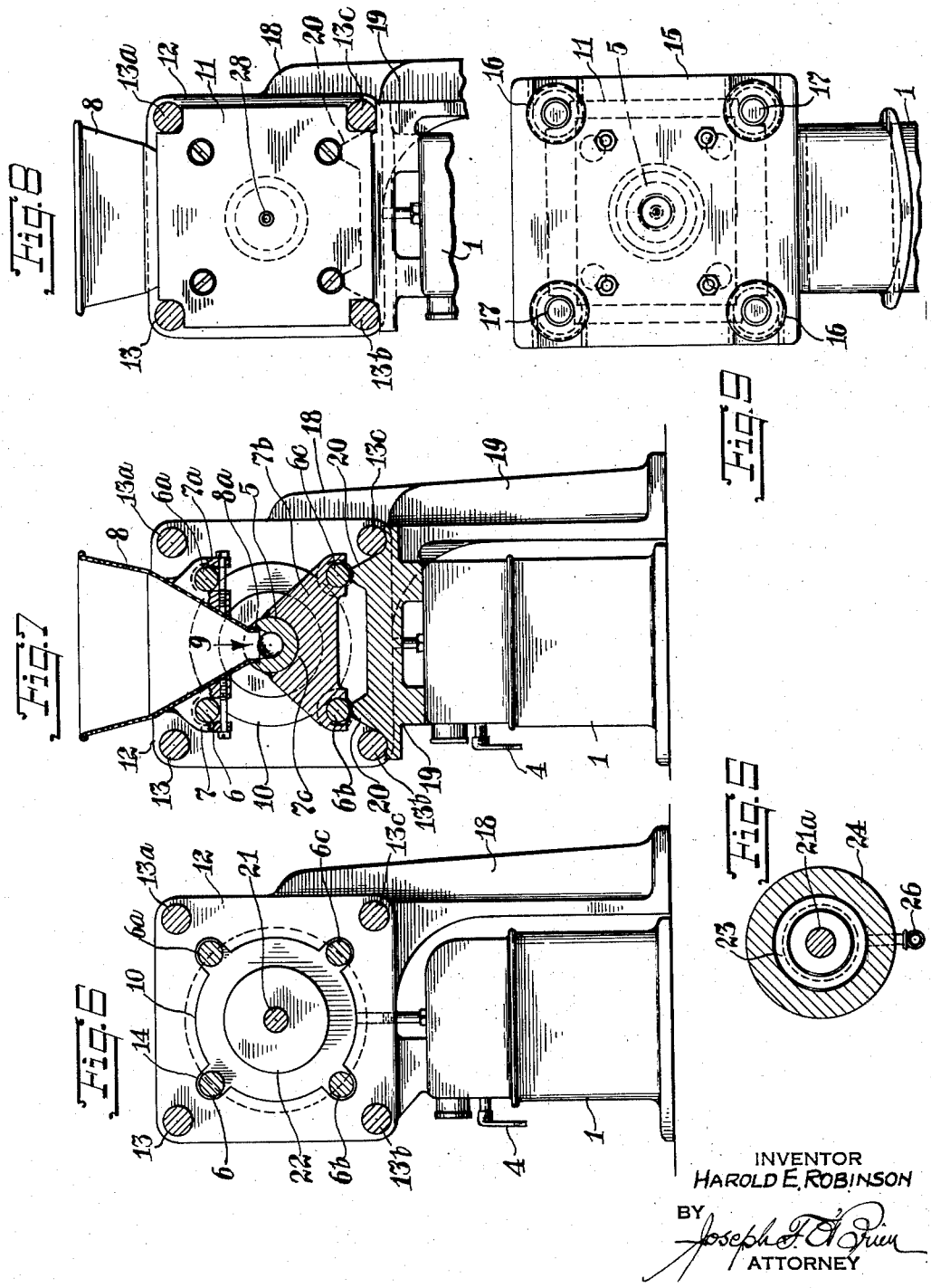

2,566,293

UNITED STATES PATENT OFFICE 2,566,293

MACHINE FOR INJECTION OR EXTRUSION OF PLASTIC MATERIAL

Harold E. Robinson, Great Neck, N. Y., assignor of one-half to Philip J. Lo Bue, Leonia, N. J.

Application March 9, 1946, Serial No. 653,415

1 Claim. (Cl. 18—30)

This invention relates to improvements in machines for injection or extrusion of plastic material.

One of the objects of this invention is, in a machine for injection or extrusion of plastic compositions fed to the bore of a plasticizing cylinder in powdered or granular form, the provision within the bore of the plasticizing cylinder of a material-spreading and homogenizing head adapted, during the plasticizing and prior to injection or extrusion of the plastic material, to force the plasticized material outwardly against the wall of the bore of the cylinder and preferably through a relatively-narrow conical space terminating in a narrow annular space between said spreading and homogenizing head and said wall of the cylinder bore, thus by a squeezing, smoothing and rubbing action or operation between the spreading and homogenizing head and the wall of the cylinder causing, before extrusion or injection, a homogenizing of the structural ingredients and characteristics of the material being plasticized and moved through the bore by a ram, conveyor screw or other material-moving element.

Still another object of my invention is, in a machine of the character specified, to provide a spreading and homogenizing head embodying a conical top portion extending from the axis of the cylinder to a position closely adjacent to the wall of the bore of the cylinder to cause a smooth, outward spreading, squeezing movement of the material to be applied uniformly and in suitable increasing progression during said squeezing, rubbing and homogenizing action.

Still another object of my invention is, in a machine of the type hereinabove specified, to provide in combination with a spreading and homogenizing head of the type specified and preferably directly at the rear of said conical spreading portion an axially-contracted reservoir section adapted, before final injection or extrusion of the material through the outlet apertures of the cylinder, to mix the spread, evenly fed and rubbed plasticized material to further homogenize the same and to cause an equalized further movement of such plasticized material and to cause such further outward movement within the plasticizing cylinder to be even and uniform and thus to enable extrusion of material of smooth and uniform dimension and to provide for the production of extruded or injected material within extremely fine dimensional tolerances.

Still another object of my invention is, in a machine of the character specified, to provide, in combination with a conical head hereinabove specified, a conical cavity in the terminal end of a cooperating plunger adapted to fit the cylinder and in its terminal extension position to enclose and closely fit over the conical portion of the said spreading and homogenizing head.

Still another object of my invention is to provide, in a machine of the character specified, a hydraulically-actuated ram having a compound movement comprising an initial hydraulically-actuated low-pressure locking and material compressing movement and a final hydraulically-actuated high-pressure extrusion movement in a machine construction arranged to cause an initial locking and compressing movement with the ram moved an initial distance into the plasticizing cylinder consonant with the low-pressure first applied thereto, and thereafter to cause a final extrusion movement in which the ram, together with the initial actuating mechanism, will move into the final extrusion position thereof.

Still another object of my invention is, in a compound hydraulic machine of the type specified, to mount the plasticizing cylinder on a sliding carrier to enable detachment and reverse movement thereof away from the extrusion plate to separate the plasticizing cylinder from said plate and to permit breaking off of any unextruded material between the nozzle and mold.

Still another object of my invention is to utilize in a device of the character specified, a plasticizing cylinder having a cold section to which granular or powdered material may be fed and a heated or hot plasticizing section, preferably heated by an electric coil surrounding said cylinder.

Still another object of my invention is, in a heated section of the character specified, to provide a branch heater extending forwardly into the homogenizing head hereinabove referred to in order to independently heat said head, and preferably to provide for this purpose a branch electrical heating element and means for connecting the same with the cylinder-surrounding element hereinabove specified.

Still another object of my invention is to provide in a device of the character specified between the extrusion nozzle and my spreading and homogenizing head a screen plate having counterbored apertures and to employ such a screen plate in connection with a spacer bushing having a final contracting or reducing chamber communicating with an axial bore which is connected with a suitable extrusion nozzle.

With these and other objects in view, the invention comprises the combination of members and arrangement of parts so combined as to coact and cooperate with each other in the performance of the functions and the accomplishment of the results herein contemplated, and comprises in one of its adaptations the species or preferred form illustrated in the accompanying drawings, in which:

Fig. 1 is a view partially in side elevation and partially in longitudinal section of a machine embodying my invention;

Fig. 2 is an enlarged fragmentary view of the plasticizing cylinder and adjacent parts shown in Fig. 1;

Fig. 3 is a section on the line 3—3 of Fig. 2 looking in the direction of the arrows;

Fig. 4 is a section on the line 4—4 of Fig. 2 looking in the direction of the arrows;

Fig. 5 is a section on the line 5—5 of Fig. 1 looking in the direction of the arrows;

Fig. 6 is a section on the line 6—6 of Fig. 1 looking in the direction of the arrows;

Fig. 7 is a section on the line 7—7 of Fig. 1 looking in the direction of the arrows;

Fig. 8 is a section on the line 8—8 of Fig. 1 looking in the direction of the arrows; and Fig. 9 is an elevation on the line 9—9 of Fig. 1 looking in the direction of the arrows.

In the accompanying drawings I have illustrated a preferred embodiment of my invention applied to a machine having a hydraulic ram, but it will be understood that many of the features of my invention may be applied to a machine in which the material is plasticized and moved by a conveyor screw or like material-compressing member. In these drawings, 1 indicates a conventional hydraulic base-casing within which is mounted the usual reservoir of hydraulic fluid, the pumping and other actuating mechanism therefor, including actuating valve-levers 2—3 and 4 for controlling the pressure-flow of hydraulic fluid for use in the piston cylinders hereinafter referred to. As shown, a supporting base bracket 18 is suitably fastened to the floor or other support and suitably supports above the casing 1 a large cylinder 12 within which reciprocates a large piston 10 having an axial bore 10$^a$ through which a ram 21 extends and is adapted to be driven by the piston 10 through a fixed disc 22. A plasticizing cylinder 5 is preferably mounted adjacent to the casing 1, and, as shown, is slidably mounted and supported in a horizontal position above the casing and in axial alignment with the ram 21. Said cylinder 5 is, as shown, supported and mounted on a group of four or two pairs of rods 6—6$^a$—6$^b$—6$^c$ which are fast at one end in the piston 10 and at the opposite end are fixedly connected to a nozzle-supporting end plate 11. As shown, the cylinder is partly supported on an upper pair 6—6$^a$ of said group of rods. This pair of rods 6—6$^a$ pass through bearing members 7—7$^a$ connected to a hopper 8 having its lower outlet end 8$^a$ extending through a feed opening 9 in the cylinder 5, and the bottom of the cylinder is supported on a supporting bracket 7$^b$ which is mounted (see Figs. 1 and 7) on the lower pair of rods 6$^b$—6$^c$ of said group. As shown, the bracket 7$^b$ is substantially triangular in outline, supported at its lower corners on the rods 6$^b$—6$^c$ and having at its apex an arcuate mounting depression 7$^c$ fitting said cylinder bottom. The assembly of piston, rods and plasticizing cylinder described is adapted to move and operate as a slidable unit supported at one end by the large piston-cylinder 12 and at the other end by said end plate 11. The nozzle-supporting end-plate 11 is slidably supported on a group of four fixed tie rods 13—13$^a$—13$^b$ and 13$^c$ which support the sliding assembly hereinabove referred to and, as shown, are rigidly connected at their inner ends, as at 14 to the forward rim 12$^a$ of the cylinder 12 and their outer opposite ends extend through a pressure head-plate 15 to which they are firmly locked by nut members 16 which engage screw threads 17 on the ends of said tie rods 13—13$^a$—13$^b$—13$^c$. The large cylinder 12 is, as aforesaid, supported at one end upon the base member 18 and the tie rods 13—13$^a$—13$^b$—13$^c$ project therefrom and are also supported intermediate their ends upon a supporting bracket 19 having legs bent rearwardly back of the casing 1 and extending to the floor. Said bracket 19, in addition to supporting the fixed tie rods, also is provided with upwardly-extending bearing portions 20 supporting and contacting the bottom portion of the lower pair of rods 6$^b$—6$^c$ of the cylinder-carrying group to slidably support the same. The piston 10 has, as aforesaid, an axial bore 10$^a$ through which the ram 21 slidably passes and as the ram is provided adjacent to the forward end of the piston 10 with an operating disc 22, the movement of the piston 10 will cause the ram 21 to be moved forwardly therewith.

In the preferred embodiment of my invention shown, the piston 10 is employed as an initial moving and locking element and I have provided for a compound movement of the ram 21. Thus, the ram 21 will be initially moved by the piston 10 operating in its cylinder 12 through the disc 22 and thereafter will be moved by a high pressure piston 23 connected to a rearward extension 21$^a$ of the ram and operating in a cylinder 24 which, as shown, is supported through end plate 25 firmly secured to the rear face 10$^b$ of the cylinder 12. The ram 21 is thus adapted to have a compound movement, first, by the piston 10 and then by the piston 23, and, in the preferred embodiment of my invention shown, I first admit hydraulic fluid to a chamber 12$^a$ behind or in back of the piston 10. This, in conventional practice, is accomplished by operation of the lever 2 and will admit into the chamber 12$^a$ fluid at a relatively low pressure of say 250 to 350 pounds and this will cause the forward movement of the ram and the cylinder 5 which has theretofore been supplied with a feed of material to be plasticized into a position in contact with the mold. Thereafter the low pressure fluid is cut off and simultaneously high pressure fluid is passed through the pipe 26 into the chamber 24$^a$ in the cylinder 24 behind the piston 23. This high pressure fluid will then force the ram 21 through the bore of the cylinder to the opposite end thereof and in such operation is adapted to plasticize material within the bore 5$^a$ of the cylinder 5 and in order to assist the plasticizing of such material a heating element 27 is mounted on the cylinder 5 to surround the same and the cylinder 5 communicates at its opposite end with an outlet nozzle 28 provided with a conventional valve at 29 and through which nozzle 28 plasticized material is adapted to be extruded and to be molded in a mold 30 or to be otherwise utilized as, for example, to provide, when properly treated, a coating for electric conductors or wires or to produce catheters or like medical instruments.

A highly important feature of my invention comprises the provision within the bore 5$^a$ of the cylinder 5 and between the compressing end 21$^b$ of the ram 21 and the extrusion nozzle 28 of a material spreading and homogenizing head 31 adapted, during the plasticizing and prior to the extrusion of the plastic material, to spread the plasticized material against the wall of the bore of the cylinder and to force the same through a conical space terminating in a thin annular space between said spreading and homogenizing head and the wall of the cylinder and to produce between said head and bore wall a homogenizing or smoothing operation on the material being extruded and moved out of the bore 5a by the ram 21.

In the preferred form of my invention, the head 31 is provided at the rear of the said annular squeezing space with an integral contracted section forming an enlarged annular reservoir space or mixing chamber 32 having at one end said narrow or material-squeezing annular space as its inlet and at its opposite end communicating with outlet apertures annularly arranged in an outwardly-extending or flaring base member 33 extending to the wall of the cylinder. The annularly-arranged apertures 34 communicate through said base member with a flatly cone shaped chamber 35 at the outer end of which I provide a counterbored screen plate 36 through which the homogenized material passes into a conical bore 37 in a spacer bushing 38 having an outlet bore 39 leading to the extrusion nozzle 28.

The action of said head not only provides the aforesaid squeezing, smoothing and rubbing action, but in combination with said reservoir section provides means which is adapted before final injection or extrusion of the material through the outlet apertures of the cylinder, to mix the spread, evenly fed and rubbed plasticized material to further homogenize the same and cause an equalized further movement of such plasticized material and to cause such further outward movement within the plasticizing cylinder to be even and uniform and thus to enable extrusion of material of smooth and uniform dimension and to provide for the production of extruded or injected material within extremely fine dimensional tolerances.

In the preferred embodiment of my invention, the end 21b of the ram is provided with a cavity 21c of conical configuration preferably produced by counterboring the end of the ram and adapted, in its final position, to fit over the conical spreading portion of the head 31 so that all material within the bore 5a will be forced rearwardly through the said thin annular space between said spreading and homogenizing head and the wall of the bore of the cylinder, thus completing the homogenizing and smoothing operation on the material as it is moved rearwardly out of the bore by the ram.

In the preferred embodiment of my invention, the conical head 31 is provided with an axially disposed heating element 40 which is preferably connected up by suitable connections with the heater 27. In this way the material passing over the head 31 is not only heated externally through the wall of the cylinder but is heated internally or axially through the head 31 and this feature obviously adds to the efficiency of the device shown and described herein. It will also be seen from the above that the bore 5a of the cylinder 5 is divided into two sections comprising a cold section at the forward end of the bore into which powdered or granular material is fed to the hopper 8 and a hot section surrounded by the heater 27 and it is within this hot section that my improved spreading and homogenizing head with its internal heat is positioned.

Having described my invention, I claim:

A device for extrusion or injection of thermoplastic material comprising, in combination, a plasticizing cylinder having an axial bore of cylindrical conformation, means for feeding to the inner end of said bore material to be plasticized, a nozzle connected to the outer end of said bore, means for heating said material adjacent to the outer end of said bore, a cylindrical ram movable within said bore, a material-spreading and homogenizing member comprising a head extending axially within said bore and provided adjacent to said nozzle with a base portion, said head having a rounded bulge portion at the middle thereof, and also being provided at the end opposite to said base portion with a free-end portion having the configuration of a right cone with its apex projecting axially toward said feeding means, said cone being provided with a gradually-inclining conical surface merging with said bulge-portion of the head to provide a narrow annular material-passing channel between said bulge portion of the head and the wall of the bore, said head having at the rear of said annular material-passing channel a radially-contracted wall portion forming between said head and the wall of said cylindrical bore a relatively enlarged annular expanding and mixing channel communicating with said narrow material-passing annular channel at its inlet, said radially-contracted wall portion merging with a surface of said base portion extending in a substantially radial direction from the axis of said head, said radially-extending base portion being provided with outlet apertures arranged annularly and extending through said base portion of the head.

HAROLD E. ROBINSON.

REFERENCES CITED

The following references are of record in the file of this patent:

UNITED STATES PATENTS

| Number | Name | Date |
|---|---|---|
| 1,961,941 | Pack | June 5, 1934 |
| 2,163,177 | Novotny | June 30, 1939 |
| 2,192,263 | Johnson | Mar. 5, 1940 |
| 2,308,867 | Dinzl | Jan. 19, 1943 |
| 2,345,917 | Coffman | Apr. 4, 1944 |
| 2,351,774 | McGowen | June 20, 1944 |
| 2,358,354 | Stacy | Sept. 19, 1944 |
| 2,367,144 | Shaver | Jan. 9, 1945 |
| 2,410,510 | Lester | Nov. 5, 1946 |
| 2,416,349 | Renier | Feb. 25, 1947 |
| 2,431,843 | Swoger | Dec. 2, 1947 |